(12) United States Patent
Wendker et al.

(10) Patent No.: US 7,644,099 B2
(45) Date of Patent: Jan. 5, 2010

(54) DYNAMIC GENERATION AND AUTOMATED DISTRIBUTION OF USER INTERFACE FROM DATABASE MODEL

(75) Inventors: Andreas W. Wendker, San Jose, CA (US); Eric Noyau, St Genevieve des Bois (FR)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 10/824,251

(22) Filed: Apr. 13, 2004

(65) Prior Publication Data

US 2004/0193652 A1 Sep. 30, 2004

Related U.S. Application Data

(63) Continuation of application No. 09/618,390, filed on Jul. 18, 2000, now Pat. No. 6,738,077.

(51) Int. Cl.
*G06F 17/30* (2006.01)
(52) U.S. Cl. .................. 707/102; 707/104.1
(58) Field of Classification Search ................ 715/513, 715/762; 707/100–200
See application file for complete search history.

(56) References Cited

U.S. PATENT DOCUMENTS

| | | | |
|---|---|---|---|
| 5,712,960 A | | 1/1998 | Chiopris |
| 5,812,134 A | | 9/1998 | Pooser |
| 5,818,936 A | * | 10/1998 | Mashayekhi ............... 713/167 |
| 6,014,138 A | | 1/2000 | Cain |
| 6,035,300 A | * | 3/2000 | Cason et al. ............... 707/102 |
| 6,404,445 B1 | * | 6/2002 | Galea et al. ............... 715/513 |
| 6,564,218 B1 | * | 5/2003 | Roth ........................... 707/10 |
| 7,076,784 B1 | * | 7/2006 | Russell et al. ............... 719/315 |
| 7,093,263 B1 | * | 8/2006 | Sexton et al. ............... 719/316 |
| 2003/0084067 A1 | * | 5/2003 | Obiaya .................... 707/104.1 |
| 2004/0024790 A1 | * | 2/2004 | Everett ...................... 707/200 |
| 2004/0054546 A1 | * | 3/2004 | Levin et al. .................... 705/1 |
| 2004/0117383 A1 | * | 6/2004 | Lee et al. .................... 707/100 |
| 2005/0102610 A1 | * | 5/2005 | Jie .............................. 715/513 |
| 2006/0064415 A1 | * | 3/2006 | Guyon et al. .................. 707/6 |

OTHER PUBLICATIONS

Czejdo et al., "A microcomputer implementation of an ER query and update interface", ACM SIGSMALL/PC vol. 19, Issue 1, Jun. 1993, P-16-31. Retrieved from the Internet:<URL: http://portal.acm.org/ft_gateway.cfm?id=155746&type=pdf&coll=ACM&dl=ACM&CFID=46047867&CFTOKEN=88071587>.*

Phol et al, "Prime—toward process-integrated modeling environments", ACM Transactions on Software Engineering and Methodology, vol. 8, Issue 4, Oct. 1999, P-343-410. Retrieved from the Internet:< http://portal.acm.org/ft_gateway.cfm?id=322995&type=pdf&coll=ACM&dl=ACM&CFID=46047867&CFTOKEN=88071587>.*

(Continued)

*Primary Examiner*—John E Breene
*Assistant Examiner*—Dennis Myint
(74) *Attorney, Agent, or Firm*—Adeli & Tollen LLP

(57) ABSTRACT

A method and apparatus for automatically and dynamically generating a user interface for a client based upon a database model. An application server creates a user interface description in accordance with the database model. The description is then distributed to the client, which interprets the description and creates the user interface therefrom.

31 Claims, 5 Drawing Sheets

OTHER PUBLICATIONS

Non-Final Office Action of U.S. Appl. No. 09/618,390 Jan. 28, 2003 (mailing date), Wendker, Andreas W., now issued as U.S. Patent 6,738,077.

Final Office Action of U.S. Appl. No. 09/618,390, Jul. 2, 2003 (mailing date), Wendker Andreas W., now issued as U.S. Patent 6,738,077.

Notice of Allowance of U.S. Appl. No. 09/618,390, Dec. 29, 2003 (mailing date), Wendker, Andreas W., now issued as U.S. Patent 6,738,077.

* cited by examiner

DYNAMIC GENERATION AND AUTOMATED DISTRIBUTION OF USER INTERFACE FROM DATABASE MODEL

CROSS REFERENCE TO RELATED APPLICATIONS

This patent application claims benefit to and is a continuation of the United States Patent Application entitled "DYNAMIC GENERATION AND AUTOMATED DISTRIBUTION OF USER INTERFACE FROM DATABASE MODEL," having Ser. No. 09/618,390, filed on Jul. 18, 2000 now U.S. Pat. No. 6,738,077.

BACKGROUND

1. Field of the Invention

The present invention relates to database software applications. More specifically, the present invention relates to the interworking of desktop applications and databases.

2. Description of Related Art

One common practice in the field of database systems deployment is to build client applications after the database is laid out and its schema or model has been defined.

Database systems primarily consist of three tiers:

Tier 1 (referred to hereafter as "database")—one or more data sources (usually relational databases, but also directory services like LDAP (Lightweight Directory Access Protocol) or object-oriented databases;

Tier 2 (referred to hereafter as "application server" or "server")—one or more server applications/systems connecting to the database and providing data to Tier 3; and Tier 3 (referred to as hereafter as "client application" or "client")—one or more programs providing a front-end to the data provided by the application server.

Object-oriented application servers present the data fetched from the data sources as objects in a high level programming language like Java. For relational database systems, servers usually have to "map" the data from the data sources into objects (transform data sources storing data in tables and fields relationally into an object framework). In the case of object-oriented databases in tier 1 such mapping is not necessary.

Application servers use a so-called "database model" or "model" to define how the data objects they work with map to the underlying data source. Models consist of "entities" which are descriptions of the data objects. Every entity describes one type of data object. Entities are defined with the help of "attributes" and "relationships" (both attributes and relationships are also referred to as "properties", so every attribute and every relationship is a property). An "attribute" is a persistent atomic piece of information assigned to a data object (for example a customer's name or an order number). Every entity has a "primary key" which is used to identify objects uniquely (usually the primary key is a subset of the attributes of the entity). Relationships define how objects behave and are conditioned in relation to one another (for example, an order can be assigned to exactly one customer (so-called "to-one relationship") and a customer can have multiple orders (so-called "to-many relationship")).

Entities in the model can map to one table in the database or to multiple ones (for example, in the case of object inheritance where different variations of an object class are mapped to different tables in the database). In relational databases, relationships are defined with the help of attributes (objects relate to each other if values of specific attributes are identical) which can map to one or multiple fields in the database. The application server can maintain attributes used for primary keys and relationships (referred to as "foreign keys") separately from the data object used to present the data from the data source, so that primary keys and foreign keys do not appear as attributes of the data object itself. The application server then handles filling in the values for these primary and foreign keys when communicating with the database.

On a system level, referring again to the three tiers, due to the inherent independence of these tiers, each client or server is typically programmed/configured to transact with the data store in an independent fashion. In the case of a client, a user interface (UI) that allows users to interact with the data store is usually built as a desktop window application displayed on the client. The UI application is built manually and is based upon a human interpretation of the database model/framework. Based on the model, the human designer would design windows and views that would present the various entities and other data objects in a friendly, easy-to-manipulate manner. Based upon this design, program code for the UI was written/generated and then the application executable compiled. The application is then executed on the client machine and then connects with the server which links the data store together with the client. The client UI is then able to fetch objects from the server and present them to the user for viewing, updating and modification as desired. Once the client UI application is developed, it can be duplicated and distributed to clients having a compatible instruction-set and/or operating system platform. However, where UI applications are needed for clients incompatible with that of the developed application, a new application, and perhaps new design, needs to be programmed, compiled and executed.

With the advent of the Java programming environment, executables could be programmed on one machine an then run on any other platform, whether compatible or not. The primary distribution of Java (a product of Sun Microsystems) applications, such as Java "applications", to clients has been via networks such as the Internet through vehicles such as connected WWW (world wide web) browsers. Even with Java, which relieves partially the problem of code incompatibility, a human must still evaluate the framework or schema and design the interface. To reduce the inefficiencies inherent in such deployment of client UIs with their databases, there is a need to automate the building of UIs.

Further, where changes are made to the framework or schema of a data store, applications must then be re-programmed and re-compiled. Often, user interfaces are not made customizable, so that the same user interface would be presented to different users. Unless the UI is customizable and customizable in conformance with the framework/schema, the UI must be redesigned and reprogrammed (even using Java) if the user is to be able to run their desired UI. For instance, an engineer may not be as concerned about a portion of the database concerning financial information. Such a user may desire to have a UI that eliminates such information from his/her view. Thus, there is also a need to both enable customization and allow for changes to schema without the added cost, complexity and time of completely re-implementing the application.

SUMMARY

The invention is a method and apparatus for automatically and dynamically generating a user interface for a client based upon a database model. An application server creates a user interface description in accordance with the database model. The description is then distributed to the client, which interprets the description and creates the user interface therefrom.

In some embodiments, a user may provide preferences and authentication to the application server which can create a modified description of the user interface.

DETAILED DESCRIPTION

The disclosure of United States Patent Application entitled "DYNAMIC GENERATION AND AUTOMATED DISTRIBUTION OF USER INTERFACE FROM DATABASE MODEL," having Ser. No. 09/618,390 filed on Jul. 18, 2000, is expressly incorporated herein by reference.

In one embodiment of the invention, a generic Java application, Java applet or similarly operating software mechanism is distributed to a client device (e.g. computer system) and then executes (either manually or automatically) on the client device. When distributed to a client device, the application/mechanism executes in a virtual machine presenting a user interface that is displayed via the client device. The user interface is automatically generated with a certain generic description but may also be customized through a variety of means. The user interface is configured according to what a user would most likely see and the way in which the user would most likely interact with the database. Advantageously, the description utilizes an analysis the model of the database that the client requests connectivity with. The database model yields clues to determining these default rules and eliminates the cost, complexity and tedium of designing and then coding user interfaces in a human-assisted fashion. Advantageously, when changes are made to the model of the database itself, the changes are by definition distributed to clients since the model is analyzed and a new description of the user interface built at each request by a client of connecting to the database.

Figure 1:
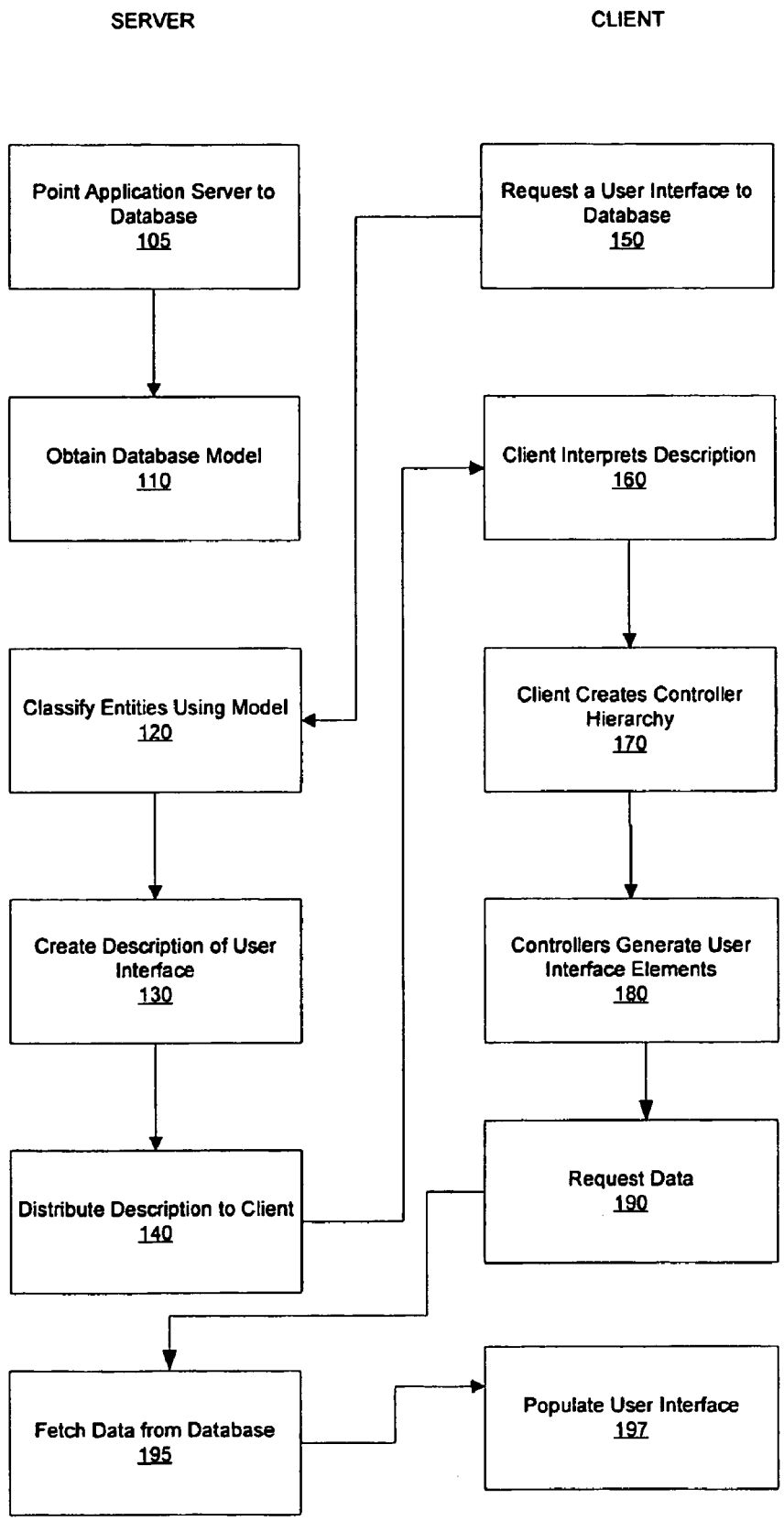
FIG. 1 is a flowchart of the essential methodology for dynamically generating a client application based upon a database model according to at least one embodiment of the invention.

FIG. 1 is a flowchart of the essential methodology for dynamically generating a client application based upon a database model according to at least one embodiment of the invention.

FIG. 1 describes a methodology involving actions by both a client and a server which may take place in various order, and with certain processes running persistently and certain other processes requiring some trigger. The server and client roles in this embodiment of the invention are delineated in FIG. 1.

As depicted below, one method of effecting dynamic client generation is to utilize an "application server" (also referred to as "server"). The application server consists of, among others, software components which enables the client to connect through a user interface to a database that may be externally located or subsist within the same operating environment as the application server. The application server may also serve as or be a component of the "database server" which acts as the point of control and access of any client to the database. The application server is first pointed to the database (or data source) that is to be the object of the actions and views of the user interface (block 105). When the application server is in this state, it is constantly pointing to the database until the server is shut down.

Once pointed to the database, the application server will obtain the database model (block 110) (for the sake of readability, the words "model" and "database model" will be used throughout this document to mean either a description of the fields, tables and relationships in the database or an object framework or similar map that defines how elements of the database are governed and connected). The database model may already exist as a graph or flat file generated or stored with the application server. If the model is not available or needs validation in case of possible modification/corruption, the model may be generated or derived by the application server analyzing the database elements directly. Through its persistency of state in pointing to the database, it will also be persistent in obtaining the model of the database such that changes therein are instantaneously reflected.

While the database model and application server are in persistent communication (blocks 105 and 110), a client may at any time request a user interface to the database from the server (block 150) (also see block 190 where data is separately requested from the database). This triggers a classification of entities in order to build a generic description of how the user interface should behave with regard to the database. Though a database model is obtained, in one embodiment of the invention, some or all entities or objects of the database may be reclassified or differently organized for the purpose of generating the user interface description (block 120). Such reclassification, which is described in detail below with respect to FIG. 3, has its essential purpose determining which entities are "main" and which are "enumeration" entities. "Main" entities are those database elements that may often be updated or are dynamically added such as a customer's orders. "Enumeration" entities are those which remain relatively static and do not need frequent updating such as a list of states or provinces as part of an address field in a customer order record, for example. Thus, while the database model may aid in this process, the model can be ignored or evaluated in a different manner depending upon the parameters of the interface to be built. Once the database model is obtained and reclassifying is achieved the application server generates a generic description that will be used by the client to generate the elements of the user interface (such as buttons, windows, drop down lists, input boxes, etc.) and their behavior (block 130).

The application server generates a description in a level of abstraction such as that provided for in XML (eXtensible Markup Language) or similar technology. Using this abstract description, the model of the database is reduced into a generic form that the client can easily interpret.

From a security standpoint, the server provides clients their only access to the database. This isolation provides security from corruption of the database, and allows dynamic representation of that model as a user interface. In this context, it becomes important that the server creates the description of the user interface, since the client is thereby not able to use the information of the database model to corrupt it.

The generic user interface description is distributed to the client upon request (block 140). One feature of an application is the ability to automatically interpret this description without regard to the platform or operating environment of the client and without any user knowledge/intervention. The distributed description is interpreted by the client with the help of an XML parser (block 160). Based on the description, the client then creates in its operating environment a "controller" (software objects that define the elements of behavior for a Java or similar application) hierarchy which is appropriate for its use (block 170). These controllers then present the various elements of the user interface on the client. The controllers thus generate the user interface elements (block 180), described in greater detail below, such as query windows and dialogs. The user interface, which is composed of these elements is displayed as a useful way of interacting with the database according to its model. The user interface will be tailored to the database which the server had originally pointed to in deriving the distributed description. Thus, where "Main" entities may require a particular type of user interface as opposed to "Enumeration" entities, such elements will be presented in a logical and useful manner such that the client can efficiently and easily deal with the data of most importance. The client then interacts with the database via the user interface thus generated.

Once the controllers have generated the elements of the user interface, it must be populated with certain data from the database. The client makes this request, automatically or manually, for data, to the server (block 190). The server then fetches the data from the database on behalf of the client (block 195). This isolates the client from directly connecting to the database. The fetched data is then transferred to the client in order to populate the user interface (block 197). Once populated, the user is ready to perform transactions on the database in a logical manner driven by the data model.

Whenever the client again requests a new downloading of data to populate the user interface, the blocks 190 through 197 may be repeated. Whenever the client is restarted, at future times when the user wishes to transact with the database, blocks 120-197 are again repeated. Each instance of the user interface is thereby kept updated with the most current data model, even if the application server and the database have been restarted in the interim. This gives a new user interface which may or may not be similar to the previously instantiated interface. For instance, if the database model had undergone changes, these changes may be reflected in the entity classification, and thus, may affect the description. This new description may thus vary from the previously distributed one in accordance with changes to the model of the database. This methodology avoids the need for any human-assisted design, compiling or stand-alone execution of a user interface that is typical of client-server database interactivity.

The user interface allows views and transactions upon the database, and can be equipped by the developer with a set of further customizable options in case the generic description does not exactly suit a particular client. Further, by maintaining control at the application server of the way the user interface behaves in each instance of connecting to the database, the developer may be able to tweak the application server in case of problems with the description generation algorithm. By starting with certain defaults, redundancies and rules that take advantage of and are inherent in the underlying model of the data, the process of building user interface is completely automated. By adhering to the model underlying the database, the user interface is "rule-driven", that is, it should by its very nature behave in a manner consistent with rules for various transactions such as updating and deleting and present itself to the client/user accordingly. Further, as shown below, the user interface application can be dynamically modified in accordance with any changes to the underlying model. Additionally, as described below, the process of building different, client-specific user interface(s) for the same database can also be enabled by a slight variation of the sending of user preferences and authentication along with the request (block 150) and a corresponding provision for such preference modifiers in the description generation.

Figure 2:
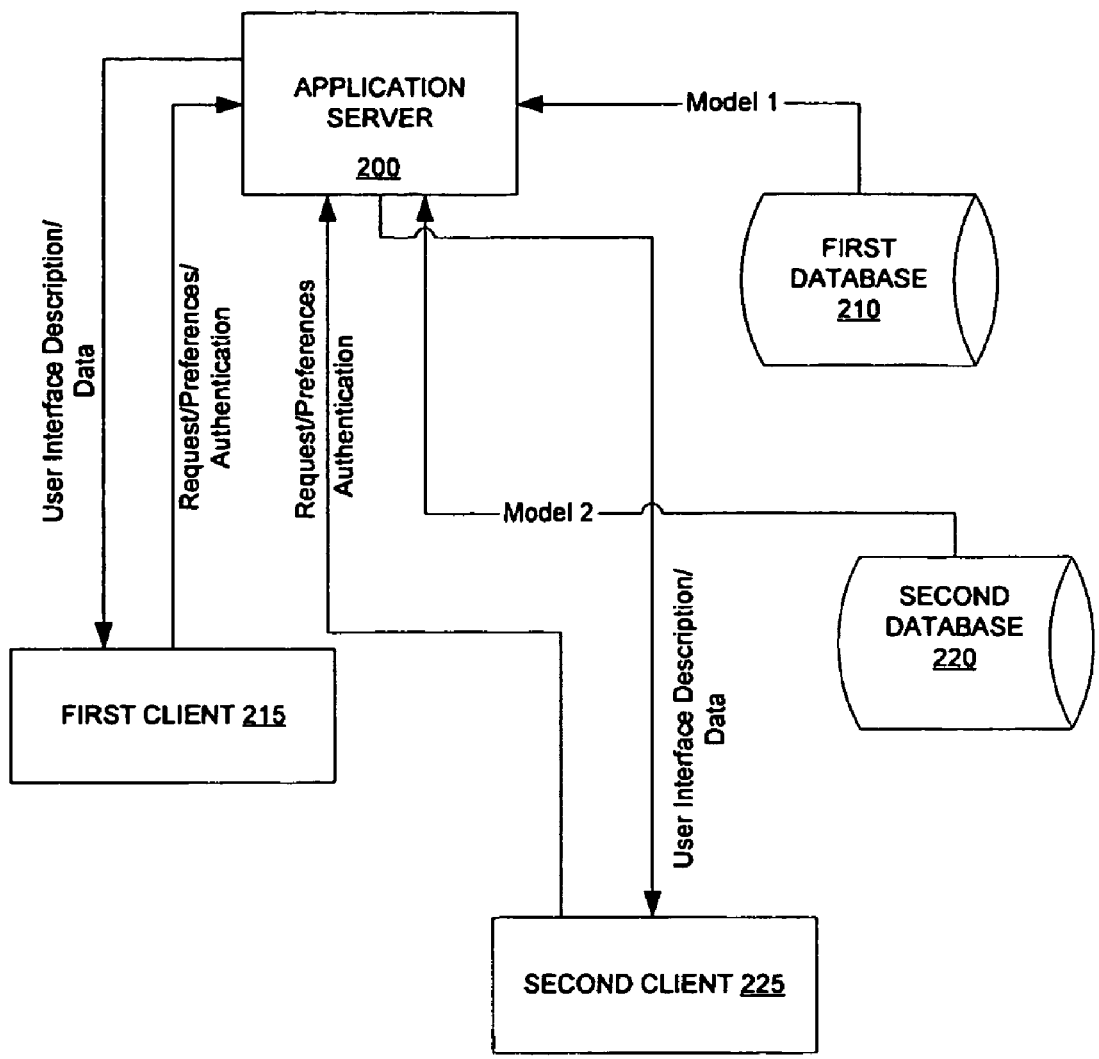
FIG. 2 is a view of a distributed client-server-database topology utilizing dynamic user interface application generation according to one or more embodiments of the invention.

FIG. 2 is a view of a distributed client-server-database topology utilizing dynamic user interface application generation according to one or more embodiments of the invention.

FIG. 2 is a distributed topology consisting of a single application server 200 connected to a first client 215 and a second client 225. The FIG. 2 topology may be representative of a wide-area network such as the Internet or a local area network, a combination of these or in some cases, a single information device having many different components that behave in a client-server fashion, and is merely illustrative of one such combination.

Each of the clients 215 and 225 may operate under different environments or platforms. For instance, client 215 might operate in a Unix environment whereas client 225 may operate in a Macintosh™ (a product of Apple Computer, Inc.) environment. The use of Java or similar write-once, run-anywhere software mechanisms would allow the same generic application to be distributed to both clients without additional modification.

Application server 200 creates user interface applications based upon a particular data source. Advantageously, a single application server, such as application server 200, may be used in creating user interfaces for more than one data source. FIG. 2 shows two data sources, database 210 and database 220, which are provided to illustrate such multiple connectivity.

In accordance with the invention, application server 200, client 215 and database 210 would interact as follows. The application server 200 would first point itself to database 210. The application server 200 is programmed/designed to either extract the model of database 210 or build a model from the data existing in the database 210. The model may be in the form of a graph, file or set of data records, and is transmitted to application server 200 and stored thereon. The persistency of the connection between database and application server thereafter continues until the server is reset.

Either at its own behest or upon a request from client 215 for a user interface to be generated, the application server 200 will generate a description of the user interface based upon the model. The description is generic (in XML or similar interpretable form) and when transformed into controllers (which create the user interface elements) on the client side, displays on the client 215 a user interface to the data stored in database 210. In one embodiment, client 215 will initiate an HTTP (HyperText Transport Protocol) or other download request through a browser or other network communication software to the application server 200. Application server 200 responds to this request by uploading the description of the user interface to client 215 through the browser running on client 215. The description is then automatically interpreted on client 215 and generates a user interface that is displayed on client 215. The user interface connects, for the purpose of querying and transacting, the client 215 to database 210. In one embodiment, the user interface is described in a generic manner without any client specific differentiation. After such a default user interface is displayed on client 215, developers may provide for customizing by users of client 215. In the typical case, tweaking of the user interface description is performed by the developer modifying the description algorithm on the application server 200.

Alternatively, the request to create a user interface to the database 210 by the client 215 may also include preferences specific to it which the application server accounts for in its creation of the user interface description. The user interface can be automatically tailored to suit client 215 specifically. This automatic customization may be achieved by the client 215 uploading its preferences or identifying itself during an initial request for a user interface to the database is made to application server 200. In response, application server 200 creates an a description of a user interface conforming with those preferences. For instance, if client 215 identifies itself or states as a preference that the user interface would be used by a sales person, then pricing and product information may be made the prominent or most easily accessible of the data in database 210 rather than human resource information which may be of less interest to the eventual user. The ability to customize a user interface in this can be an automated process.

Along with preferences, prior to the downloading of the user interface description from the server 200, the clients 215 and 225 may also send authentication information such as user names, passwords or security keys. This authentication will help to ensure that only authorized users have access to any of the databases 210 and 220. Where an authentication fails, the user would be so alerted, and thus, no user interface description nor data from the database would be available from the server 200.

One further advantage of the application server 200, as constructed, is its ability to create user interface generating applications for more than one datasource. For instance, application server 200 could extract/retrieve a data model for another data source such as database 220. From this model for database 220, using an identical process to that of creating the user interface generating application for database 210, a second user interface description can be created on application server 200. Once the second description is downloaded from application server 200, the client 215 can interpret this description and generate therefrom a user interface that connects client 215 to database 220 through the server 200. As with the user interface for connecting database 210, the second user interface may be optionally customized during description generation or by tweaking after several instances of the interface have been run.

A further advantage of the invention is the ability to create user interfaces independent of the client platform. The client should be able to interpret the description in the same way as any other client, but can produce the user interface elements therefrom using whatever objects or other structures suit it. This is because the exchange of data between client and server is described in an abstract manner. Thus, in order to generate a user interface for another client such as client 225 to connect to database 220, the same description created by the application server 200 to connect client 215 with database 220 can be re-used and downloaded by client 225 without modification. This can be achieved successfully even if client 215 and client 225 operate on different platforms, operating environments and or instruction sets. Where automatic customization based on client identity or preference is performed when creating the description, the description for client 215 may then have to be modified for use with client 225 if client 225 has different preferences than client 215.

Application server 200 also provides data from the databases 210 and 220, as desired, after the clients 215 and 225 have created their respective user interfaces. This data is then used to populate the user interfaces of the clients 215 and 225.

Figure 3:
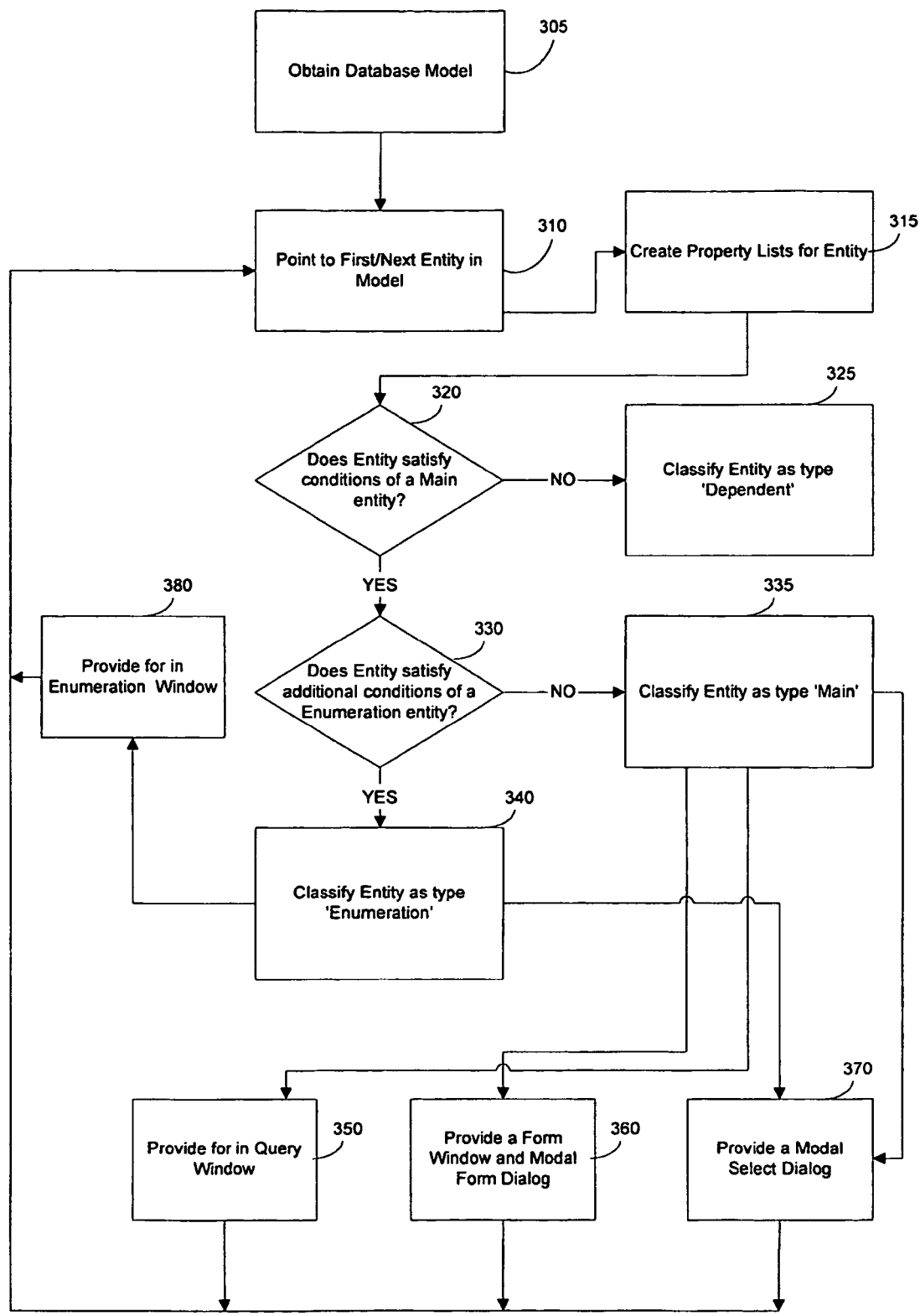
FIG. 3 is a flowchart showing default rules for creating a user interface description given a database model.

FIG. 3 is a flowchart showing default rules for creating a user interface description given a database model.

The process of creating a user interface description entails estimating using a heuristic what a user would most likely want to see and in what manner. Using the database model which may be obtained (block 305) as explained above the heuristic begins with certain "default rules" which include 1) classifying of entities, 2) creating of property lists for each entity and 3) providing of certain user interface windows based upon the classification. This process is outlined in FIG. 3 which does not intend to show a particular ordering of elements therein, but rather, the overall methodology.

Once the database model is obtained (block 305) a number of classification procedures take place. Each entity in the model is pointed to and considered separately (block 310). For each entity present, four property lists are created (block 315), one corresponding to each of four tasks-Identify, Query, List and Form. These are described in more detail below. In addition to this creation of property lists, entities are classified by analyzing the model.

The heuristic for entity classification demarcates entities into one and only one of three types-Main, Enumeration and Dependent. The decision is based on the entities satisfying certain conditions. The conditions causing an entity to be classified as Main also apply to Enumeration entities, except that enumeration entities will have to meet additional conditions. For this reason, it is most efficient to check if the entity satisfies conditions of a Main entity (block 320). For example, if the following conditions are satisfied, the entity may be classified as Main (but might instead be an Enumeration entity, if it satisfies other conditions as well):

1) The primary key of the entity should not be dependent on a primary key from another entity (no other entity should "propagate" the primary key to the entity); and 2) No other entity should have a relationship with a "cascade delete rule" to the entity in question (which means that if the object of the other entity is deleted, the objects referenced through the relationship are also deleted at the same time).

If at least the above conditions are not all satisfied, then the entity is neither a Main or Enumeration entity. Thus the entity is classified as type 'Dependent' (block 325). If the above conditions are satisfied, then the heuristic needs to determine whether the entity could qualify as an Enumeration entity (checked at block 330). Some exemplary additional conditions of an Enumeration Entity are as follows:

3) The number of attributes is very small, for example, less than 5;

4) The entity has no relationship that is mandatory (that has to be filled with a value); and 5) All relationships of the entity should have a "deny delete rule" (which means that the object of the entity is forbidden to be deleted if there are objects referenced in the relationship).

If the above three additional conditions are not satisfied by the entity, then the entity can be classified definitively as of type 'Main' (block 335). If the above conditions are also satisfied, then the entity is classified as type 'Enumeration' (block 340). With the entity thus classified, the process then provides various types of windows that will eventually appear upon the executing of the user interface that is being described. The entity is provided for in the appropriate window based upon the classification type of the entity.

Main entities are those that a user would work with most frequently. Thus, for every Main entity, a view (e.g. a tab) is created in the "Query" window of the user interface. The Query window is considered the primary window within the user interface viewing area and appears automatically when the user interface application is started up on the client. The Query window provides every Main entity a view within its purview (block 350). The Query Window is a starting point for searching for objects or data elements, and from there, opening up form windows in case editing or display of details are desired.

Enumeration entities typically define a collection of values that represent a list of choices. These values are typically static and would not require constant updating. Thus, Enumeration entities are not provided for in the Query window, but instead are given a view within the "Enumeration" window (block 380). An Enumeration Window may consist of simple lists and can be edited without the use of additional form windows. This reduces the complexity of the user interface application by providing complex form-based editing to only Main entities, and leaving Enumeration entities to a single edit window. The Enumeration entity is a type of entity that does not contain many associated objects or referential constraints, such as a designation of a Country field in an address. The user would not ordinarily want to transact with an Enumeration entity other than to perform a search upon it as a field or to pick a value from a drop down list or combo box in the case of an edit/update.

A "modal dialog" is a special window that forces the user to finish the transaction/operation or work in that window before anything can be done. Modal dialogs are used to control the workflow of the application. A "Modal Select Dialog" is provided for every Main and Enumeration entity and is used to set or update relationships (they allow the user to choose one or multiple objects to be added to a relationship) (block 370). A Form Window (for editing objects) and a Modal Form Dialog (for inserting new objects) is provided for every Main entity (block 360). The Modal Form Dialog is used to insert new objects to be added to a relationship (the user can navigate to a Modal Form Dialog from a Modal Select Dialog if the object desired could not be found in the database). The modal dialogs typically appear only when the user requests them and are thus enabled but not present as a real window when the user interface application first opens.

For entities that are classified as type 'Dependent', these are provided for by the user interface tools of Main entities. Dependent entities may be edited inside a Main entity's form window. When all of the various windows are provided for or the entities represented therein, the process points to the next entity in the model and repeats blocks 315 through 380 (block 310).

Customization

The user interface that eventually runs on the client will also be customizable in case the default rules don't match what the user might want. This customization can be done automatically through the use of preferences such that the default rules are modified during the description generation to take account of them. For instance, if the user, by his job function deals not at all with certain entities that would technically be classified as Main entities, these entities could be reclassified such that they do not appear in and clutter the Query window un-necessarily. In another embodiment, the customization may also be achieved after the application is created and after the user interface application is run on the client. This after-execution customization could be achieved manually by the user with the aid of built-in tools or an external application. Some features of customization are:

1) Ability to modify the set of Main entities

2) Ability to modify the search attributes in the Query window and specify the order in which attributes are displayed in the results table of the Query window 3) Ability to specify the order of attributes and relationships that can edited in a form.

4) Ability to change the user interface element (e.g. tab, drop-down list, text box etc.) used to edit and display attributes.

Look-and-feel, alignment and labeling of the various parts of the user interface are also created by applying default rules, much like those for entity classification. Customization as to look-and-feel, labeling and alignment of windows, tabs, views and dialogs can also be enabled for the user interface application. This can be achieved either by including custom rules during the application creation or by providing a more complex customization tool to the client or a combination of both.

Property Lists

As described above, each entity has four property lists, one for each of the tasks-Query, Display, Identify, and Form. The criteria for creating these lists, for example may be as provided below:

A. Identify Property List:
1) If the attributes used the for primary key are part of the data object, then only those primary key attributes are used for the identify property list;
2) If criteria (1) is not true, all mandatory attributes are used, string type attributes are preferred if multiple attributes are mandatory;
3) If no attributes are mandatory, all non-mandatory attributes and mandatory to-one relationships are used; and
4) If no attributes are available and no to-one relationship is mandatory, then all non-mandatory to-one relationships are used.

B. Query Property List:
1) All properties from the Identify property list; and
2) All mandatory attributes with a string type; and
3) All mandatory to-one relationships;
4) If no mandatory attributes nor to-one relationships are available, then all non-mandatory attributes are used.

C. List Property List:
1) All properties from the Identify property list; and
2) All attributes with a string type; and
3) All mandatory to-one relationships.

D. Form Property List:
1) All properties from the Identify property list; and
2) All attributes;
3) All to-one relationships; and
4) All to-many relationships.

The "string type" denoted in the above criteria refers to attributes that are composed of a string of characters (rather than strictly numerical or Boolean type, for example). The above list is merely exemplary of one such arrangement, and is not intended to be exhaustive of the possible conditions or combination thereof that may be employed in property list configuration.

Figure 4:
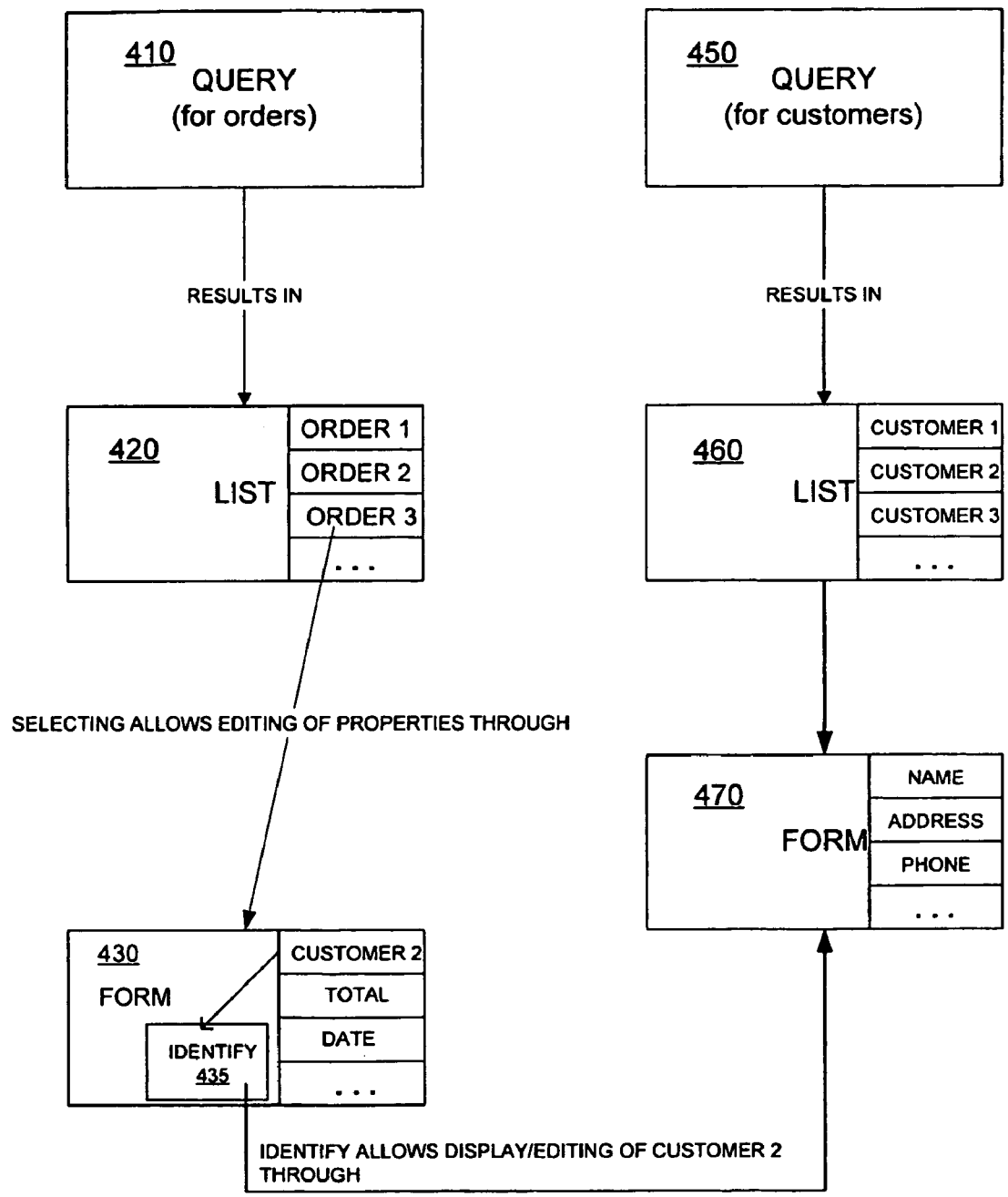
FIG. 4 illustrates the interaction of tasks involving the database.

FIG. 4 illustrates the interaction of tasks involving the database.

Once the user interface is displayed on the client, a number of tasks may be initiated by the user. The "root" or primary level task is the Query 410 to the database. The Query window enables the user to input one or more conditions and receive a list of the results of records in the database that meet those conditions. The Query task 410 leads thus to the List task, which displays to the user in a list or table form the results of the search or conditional Query 410. The Query task 410 initiates a List task 420. The List task 420 decides what fields of the records are displayed side by side (in the rows) of the results list. The displayed results may include Main, Enumeration or Dependent entities. When the relationship of a particular entity to another entity within the results produced by the List task 420 need to be edited or displayed, an Identify task 440 is initiated. Identify task 440 displays to the user a small subset of properties needed to make decisions regarding entity relationships in a given record. When all properties of a given result need to be displayed/edited, a Form task 430 is utilized. The Form task 430 effectively performs a query of sorts to retrieve all properties and attributes of a given result. The hierarchy illustrated by the arrows in FIG. 4 is a logical diagram but not exhaustive of the possible interactions among tasks. For instance, there may be occasions where Identify task 440 is initiated via the results of Form task 430. Also, for instance, a List task 420 may be initiated by some user trigger during a entity relationship edit presented by Identify task 440.

FIG. 4 embeds the example of a customer orders database upon which a Query task 410 is initiated. For instance, conditions may call for all of the month's orders to be displayed so that shipping status may be updated. The Query task 410 initiates a List task 420 which displays a table of orders (Order 1, Order 2, Order 3, . . . ). The list may contain all the properties of each order, but certain important ones. This decision of what to display is based upon the description of the database model which outlines the relative importance to the user of certain fields versus certain others. With these "rules" embedded into the operation of the user interface, the List Task 420 would know, for instance, to list on each row, the date of the order, the customer name, and order total. Assume that an Order 3 is related to an instance of another main entity, namely, a Customer 2. If the user wants to view or edit all of the properties/attributes of Order 3, then a Form task 430 would be initiated. The Form task 430 then displays the identification of the customer placing Order 3, namely, Customer 2, and the date and total of the order.

If the details of the customer's information need to be displayed, then the properties of an Identify task 435 are used to display this relationship. Identify task 435 occurs within the auspices of the results of another task, Form task 430. In this case, assume that the details of the customer field, which is a Main entity in its own right, need to be displayed. When the user requests such a display, Identify task 435 displays the properties relating to Customer 2, which is the customer related to Order 3. The Identify task 435 allows the user to invoke another Form task 470 which is used to edit/display the attributes of customers, such as Name, Address, Phone etc. The Identify task 435 pops open a new window via Form task 470 for the editing of the attributes relating to Customer 2.

A second means of editing/displaying Customer 2 is to invoke the same process as that shown for orders. First, a Query task 450 is invoked for the customers. This results in a List task 460 displaying customers in the database such as Customer 1, Customer 2, Customer 3, etc. If the attributes of Customer 2 need to be drilled down, then Form task 470 is invoked to display them. Hence, either through an Identify task 435 from within another Form task 430 or through a separate Query 450 and List 460 for customers, Customer 2 may be displayed in all of its attributes.

Each of the tasks described above will display forth user interface elements in accordance with the description and rules of the database. The behavior of the user interface depends upon these rules and upon the description of the database given to the client by the server. The tasks and exemplary data shown in FIG. 4 and described above is merely illustrative and not intended to convey particular details of the invention.

Figure 5:
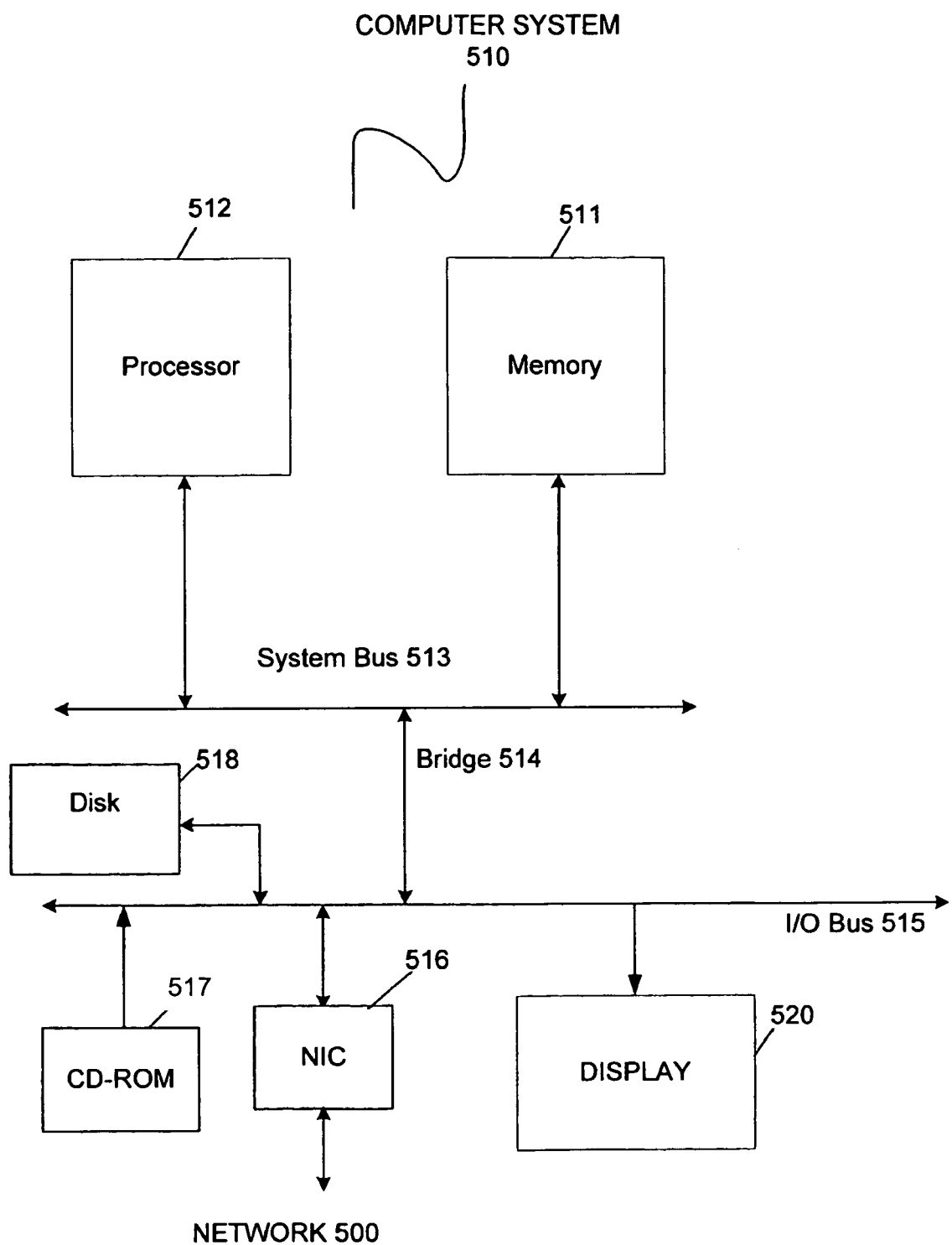
FIG. 5 shows a computer system that can act as a client or server according to the various embodiments of the invention.

FIG. 5 is a diagram of an exemplary computer system that may act as an application server and/or client according to one or more embodiments of the invention. Illustrated is a computer system 510, which may be any general or special purpose computing or data processing machine such as a PC (personal computer). Computer system 510 is coupled to a network 500 which may connect to one or more networks, such as a Local Area Network or the Internet, enabling computer system 510 to transact information with other computer systems or information devices. The computer system 510 is described when behaving in its capacity as a database server or as a client, but in the absence of other devices that may act as client or server, may also behave as both. Typically, however, there are two separate and distinct computer systems, which have many hardware elements, pictured in FIG. 5, in common, but will have different software functionality.

One of ordinary skill in the art may program computer system 510 to act as an application server that is capable of dynamically creating a user interface description based upon a database model. According to one or more embodiments of the invention, an application server performs at least the following functions:

Fetches and analyzes the database model

Classifies entities and creates property lists for the entities

Creates a generic description of a user interface that enables windows and other user interface tools (such as dialog menus, forms, etc) to appear and run on a client.

Distributes the description to a client

Fetches data from the database

As either client or server, computer system 510 has a processor 512 and a memory 511, such as RAM, which is used to store/load instructions, addresses and result data as desired. Typically, when software objects such as controllers of the user interface are instantiated, the instructions pertaining to implementing the controllers are loaded into memory 511, executed by processor 512 and then given a memory space within 511 to execute. The implementation of the above functionality in software may derive from an executable or set of executables compiled from source code written in a language such as C++ or Java (a product of Sun Microsystems). The instructions of those executable(s), may be stored to a disk 518, such as a hard drive, or to memory 511. The function of storing the database and database model may be performed by disk 518, which can be accessed during the user interface description creation tool.

Computer system 510 has a system bus 513 which facilitates information transfer to/from the processor 512 and memory 511 and a bridge 514 which couples to an I/O bus 515. I/O bus 515 connects various I/O devices such as a network interface card (NIC) 516, disk 518, CD-ROM 517, and to the system memory 511 and processor 512. The NIC 516 allows the description generated by the application server to be distributed to clients connected to network 500.

When computer system 510 behaves as a client, it may make request data or the user interface description or send preferences/authentication to the server (using NIC 516) in conjunction with that request. Once the description is downloaded, it can be interpreted in memory 511 (in a browser execution instance or memory space, for example) and implemented by processor 510. The interpreted description creates a user interface that is displayed to the user. The windows of the user interface application may be displayed onto a display device (e.g. monitor) such as display 520. Through other input devices, such as a keyboard and/or mouse (not shown), the user can input data through the user interface. This data is then sent to the database to which the client is connected. In case the database is not local, the NIC 516 is used to send/receive data from the database which may exist somewhere on or off of network 500.

We claim:

1. A method for creating a description of a user interface that transacts with a database having a data model comprising a plurality of entities, the method comprising:

a) receiving a request for the user interface from a client;

b) after receiving said request, classifying the plurality of entities into entity types, the classifying comprising:

iteratively determining whether each entity in the plurality of entities satisfies a set of conditions; and when an entity satisfies the set of conditions, classifying the entity as a particular entity type for which a user interface element is created within a particular window of a set of windows, wherein the user interface element provides access to said entity through the user interface;

c) creating the description of the user interface with at least one user interface element based upon the classification of the plurality of entities; and d) distributing the description to said client in order to allow said client to generate user interface elements of said user interface that permits a user to transact with said database.

2. The method of claim 1 wherein:

each entity in the data model describes a type of data object associated with the database; and the classifying produces the particular entity type for a first group of data objects and a second different entity type for a second group of data objects, the data objects in the first group of data objects being updated in the database more frequently than the data objects in the second group of data objects.

3. The method of claim 2 wherein the particular entity type is a Main entity type and the second different entity type is an Enumeration entity type.

4. The method of claim 1 wherein the description is a generic description configured to be interpreted in different platforms or operating environments.

5. The method of claim 1 wherein the description is in eXtensible Markup Language (XML).

6. The method of claim 1 wherein the classifying and creating are performed automatically without human assistance.

7. The method of claim 1 further comprising:

before the classifying, obtaining a current data model of the database, the current data model reflecting any changes to the database up to when the current data model is obtained, wherein a current description of the user interface is created using the current data model of the database.

8. The method of claim 1 further comprising:

after sending the description, retrieving data from the database, said data for populating at least one generated user interface element; and sending the data to the client, said data sent prior to receiving any transaction from said user.

9. The method of claim 1, wherein said request from said client initiates the classification of the entities into entity types.

10. The method of claim 1, wherein each entity corresponds to at least one table of said database.

11. A computer readable medium of a computer system implementing a server application, the computer readable medium storing a computer program which when executed by at least one processor of the computer system creates a description of a user interface that transacts with a database having a data model comprising a plurality of entities, the computer program comprising:

a) a set of instructions for classifying the plurality of entities into entity types, the instructions for classifying comprising:

a set of instructions for iteratively determining whether each entity in the plurality of entities satisfies a set of conditions; and a set of instructions executed when an entity satisfies the set of conditions, said set of instructions for classifying the entity as a particular entity type for which a user interface element is created within a particular window of a set of windows, wherein the user interface element provides access to said entity through the user interface;

b) a set of instructions for creating the description of the user interface with at least one user interface element based upon the classification of the plurality of entities.

12. The computer readable medium of claim 11 wherein the description is a generic description configured to be interpreted in different platforms or operating environments.

13. The computer readable medium of claim 11 further comprising a set of instructions for sending said description to said client in order to allow said client to generate elements of said user interface from said description, said user interface elements allowing a user of said client to transact with said database.

14. The computer readable medium of claim 11, wherein an entity describes a data object of said database through properties comprising at least one of an attribute and a relationship.

15. The computer readable medium of claim 14, wherein the entity corresponds a table of said database.

16. A method for generating a user interface on a client computer system that transacts with a database of a server computer system, said database having a data model comprising a plurality of entities, the method comprising:

sending a request for the user interface from the client computer system to the server computer system;

receiving a description of the user interface at the client computer system, the description being based upon a set of conditions that classify the plurality of entities into entity types, said classification of the entities initiated by the request, wherein when an entity satisfies the set of conditions, the classification comprises classifying the entity as a particular entity type for which a user interface element is created within a particular window of a set of windows in the description of the user interface, wherein the user interface element provides access to said entity through the user interface; and generating the user interface with at least one user interface element using the description of the user interface, wherein said user interface allows a user to transact with said database.

17. The method of claim 16 further comprising:

after the generating, receiving data from the database in order to populate the at least one user interface element of said user interface, said data received prior to receiving any transaction from said user.

18. The method of claim 16 further comprising, before the receiving:

sending preferences for the user interface, the preferences being utilized to create a custom user interface description based on the specified preferences.

19. The method of claim 16 further comprising, before the receiving:

sending authentication information.

20. A computer readable medium of a computer system, the computer readable medium storing a computer program which when executed by at least one processor of the computer system generates a user interface that transacts with a database of a server device having a data model comprising a plurality of entities, the computer program comprising:
- a set of instructions for receiving a description of the user interface, the description being based upon a set of conditions that classify the plurality of entities into entity types, wherein the classification comprises classification of an entity as at least (i) a first entity type for which a user interface element is created within a first window of a set of windows in the description of the user interface in order to access said entity upon determining that the entity satisfies the set of conditions and (ii) a second entity type for which a user interface element is created within a second window of the set of windows in the description of the user interface in order to access said entity upon determining that the entity does not satisfy the set of conditions; and
- a set of instructions for generating the user interface with at least one user interface element using the description of the user interface.

21. The computer readable medium of claim 20 wherein the description of the user interface is created using a current data model of the database, the current data model reflecting any changes to the database up to when the description is created.

22. The computer readable medium of claim 20, wherein the computer program further comprises:
- a set of instructions for sending preferences for the user interface, the preferences being utilized to create a custom user interface description based on the specified preferences.

23. A system comprising:
- a first computer system comprising (i) a database having a data model comprising a plurality of entities, and (ii) a sewer communicatively coupled to the database for creating a description of a user interface that transacts with the database, the description being based upon a set of conditions that classify the plurality of entities into entity types, wherein when an entity satisfies the set of conditions, the classification comprises classifying the entity as a particular entity type for which a user interface element is created within a particular window of a set of windows in the description of the user interface, wherein the user interface element provides access to said entity through the user interface; and
- a second computer system comprising a client for receiving the description from the server and for generating the user interface as defined within the description.

24. The system of claim 23 wherein the server obtains a current data model of the database, the current data model reflecting any changes to the database up to when the current data model is obtained, a current description of the user interface being created using the current data model of the database.

25. The system of claim 23 wherein the server is in persistent communication with the database.

26. The system of claim 23 wherein the server of the first computer system is communicatively coupled to the client of the second computer system via a network and distributes the created description to the client for enabling the client to generate the user interface.

27. The system of claim 26 wherein the server of the first computer system provides the client of the second computer system an only point of access to the database of the first computer system.

28. The system of claim 26 wherein the server of the first computer system is communicatively coupled, via the network, to a client of a third computer system having a different platform or operating environment than the client of the second computer system, and distributes the created description to the client of the third computer system for enabling the client of the third computer system to generate the user interface.

29. A computer implemented method of providing a user interface, said method comprising:
- a) obtaining a data model of a database representing an organization of a plurality of data entities of the database;
- b) receiving a request for a user interface from a client;
- c) in response to the request, dynamically creating a description of said user interface (i) by using a set of heuristics to select a set of data entities from the plurality of data entities for access by the client through a primary window of the description based on a relevancy of the set of data entities to the client, and (ii) by providing a set of tasks operable on each data entity; and
- d) sending said description to said client in order to allow said client to generate said user interface from said description, said user interface comprising user interface elements that permit a user of said client to implement one of said set of tasks in order to transact with said database in a manner conforming to said data model.

30. The method of claim 29, wherein the obtaining the data model comprises at least one of:
- extracting the data model from said database, and
- building the data model from data that exists in said database.

31. The method of claim 29, wherein each data entity corresponds to at least one table of said database.

* * * * *

UNITED STATES PATENT AND TRADEMARK OFFICE
CERTIFICATE OF CORRECTION

PATENT NO.        : 7,644,099 B2                                      Page 1 of 1
APPLICATION NO.   : 10/824251
DATED             : January 5, 2010
INVENTOR(S)       : Andreas W. Wendker et al.

It is certified that error appears in the above-identified patent and that said Letters Patent is hereby corrected as shown below:

On the Title Page
Item (*) Notice
Delete "by 249 days"
Insert -- by 658 days --.

In column 2, line 33, delete "an" and insert -- and --, therefor.

In column 6, line 6, after "creates" delete "an".

In column 9, line 57, after "entities" insert -- . --.

In column 9, line 60, after "window" insert -- . --.

In column 9, line 34, in claim 23, delete "sewer" and insert -- server --, therefor.

Signed and Sealed this

Fourteenth Day of September, 2010

David J. Kappos
*Director of the United States Patent and Trademark Office*